Patented Aug. 22, 1944

2,356,218

UNITED STATES PATENT OFFICE 2,356,218

FERMENTATION PROCESS FOR PRODUCTION OF ETHANOL

Leo M. Christensen, Miller, Nebr., assignor of one-third to Frank L. Robinson, Kearney, Nebr., and one-third to John L. Ledbetter, Jr., Scarsdale, N. Y.

No Drawing. Application September 2, 1941, Serial No. 409,316

3 Claims. (Cl. 195—15)

This invention relates to the production of ethanol by enzymatic conversion of amylaceous materials, and more particularly to an improved method for the conversion of the starch content of such amylaceous materials to fermentable sugars.

In order to produce ethanol from amylaceous materials or grains, it is first necessary to convert the starchy content thereof to fermentable sugars. This step, known in the art as saccharification, comprises essentially a hydrolysis of the starch to certain specific sugars which are fermentable by yeast. Accordingly, the production of alcohol from amylaceous materials involves the following steps: gelatinization of the starch, usually by heating with water and under pressure if desired; cooling and mashing with an enzymatic diastatic material, ordinarily dried barley malt, to convert the starch present to fermentable sugars; and cooling and fermenting the sugar solution thus obtained with a suitable yeast to convert the sugars to ethanol. Thus, it will be apparent that the yield of ethanol obtained is dependent in part upon the degree of conversion of the starch to fermentable sugars and in order to secure optimum ethanol yields, this conversion must be quantitative.

Processes of the prior art have not been entirely satisfactory for a number of reasons, two of which appear to be the most important factors. In the first place, a relatively poor yield of ethanol is obtained, due to incomplete conversion of the starchy content of the grain to fermentable sugars. Secondly, the use of barley malt as the saccharifying agent materially increases the cost of production of ethanol since relatively large amounts are necessary and there is considerable expense involved in its production.

Numerous attempts have been made to so modify the prior art processes as to avoid their disadvantages and some of these have resulted in somewhat improved ethanol yields. I have found that a diastatic mold grown on a solid substrate, and more particularly a mold bran prepared by growing *Aspergillus oryzae* on wheat bran, may be effectively substituted in the known process for the costly malt. Moreover, since the incomplete conversion of the starchy content of the grains used is due to an irreversible change in some of the starch rendering it difficult to saccharify, which irreversible change is occasioned partly by the customary slow cooling of the cooked mash to saccharification temperatures, improved yields of ethanol may be obtained by cooking the mash in acid condition and/or by effecting practically instantaneous cooling and addition of the saccharification agent. These methods either prevent the occurrence of any irreversible conversion of the starch or preclude the formation of more than mere traces of unfermentable carbohydrate material and they are specifically described and claimed in my copending applications, Serial No. 385,548 filed March 27, 1941, and Serial No. 359,433 filed October 2, 1940.

According to the present invention I have discovered another method of preventing loss of carbohydrate in starchy mash fermentation with resultant increased yields of ethanol over those previously obtainable. This method comprises the addition of an enzymatic diastatic saccharifying agent to the cooked grain mash in a plurality of stages, at least one of which must take place after the mash has been inoculated with yeast and the fermentation has commenced.

I believe that the beneficial effects of my multi-stage saccharification and fermentation process may be explained as follows, although I do not want to be limited to the theory set out: Enzymatic diastatic agents contain many enzymes, some of which produce readily fermentable sugars from starch while others bring about other changes such as, for example, repolymerization of the sugars to polysaccharides with an unfermentable linkage or grouping. When only one addition of the diastatic agent is made, as in prior art processes, it must be large enough to theoretically convert all of the starch present to sugars. There is a consequent large production of fermentable sugars at this stage but in the presence of the high concentration of undesirable enzymes necessarily accompanying the desirable enzymes, these fermentable sugars are in part repolymerized and thus rendered useless for the fermentation stage which follows. Moreover, because of the destruction of enzymes during the fermentation operation, before all of the starch has been converted the concentration of enzymes has decreased to a point where the best conversion cannot be realized. On the other hand, by replenishing the supply of the desirable enzymes through use of a plurality of small additions both before and during the fermentation operation according to the present invention, the concentration of undesirable enzymes is kept below the danger point and there is a gradual and continuous conversion of starch to sugar to ethanol, rather than of starch to sugar to polysaccharide.

It is an advantage of the present invention that the plurality of additions of the enzymatic diastatic agent serves to maintain the desirable enzyme concentration considerably longer than the time in which a single addition is effective. At the same time, an undesirably high enzyme concentration at any time is avoided.

The invention will be described in greater detail in conjunction with the following specific example, it being understood that the example is merely illustrative and the scope of the invention should not be limited to the exact details therein set forth.

EXAMPLE

Corn was ground, mixed with water and cooked at 130°–140° C. for about 20–40 minutes in a closed steel cooker with an agitator by injection of steam through suitable jets. The mash containing gelatinized starch was then cooled to 55°–60° C. by releasing the pressure to atmospheric and vacuum evaporating in the cooking vessel. This cooling step required about 30–60 minutes.

Mold bran, prepared as described below, was then added to the mash in the amount of 2% of the grain content thereof on a moisture-free basis. Only about 15%–25% of the starch was converted to fermentable sugars at this point. The mash was held at about 55 C. for a short time and then cooled to about 30 C. by vacuum evaporation or by pumping through a jacketed cooler.

Inoculation with a suitable strain of yeast, *Saccharomyces cerevisiae*, in the usual manner then took place and the fermentation was allowed to proceed at about 32° C. for about 20–24 hours when its rate decreased somewhat. At this point it was determined by chemical analysis that from 75%–80% of the starch had been converted into sugar and fermented, thus showing that the diastase of the mold bran had continued to act during the fermentation procedure since only 15%–25% of the starch had been converted upon inoculation with yeast.

A second mold bran addition was then made in the amount of 1.5% of the original grain content of the mash and the stirred mash was aerated for about 15 minutes.

A number of experiments were carried out, following the procedure set out above, with variations in the time of the second addition of mold bran and in the amount then added. The following tables show the results obtained, the first mold bran addition in all cases being 2% of the original corn on a dry weight basis:

TABLE I

*Influence of the amount of mold bran added at the 48th hour of fermentation*

| Mold bran, percent of corn originally present in mash | Ethyl alcohol yield, percent of total dry corn and mold bran added to fermentation |
|---|---|
| 0 | 35.6 |
| 0.25 | 36.5 |
| 0.50 | 37.1 |
| 0.75 | 37.4 |
| 1.00 | 37.7 |
| 1.50 | 38.2 |
| 2.00 | 37.5 |
| 2.50 | 36.9 |
| 3.00 | 36.3 |
| 3.50 | 36.2 |
| 4.00 | 36.1 |
| 4.50 | 36.0 |

TABLE II

*Influence of the time of making the second mold bran addition of 1.5% of the original corn*

| Time of addition, hours after inoculation | Ethyl alcohol yield, percent of total dry corn and mold bran |
|---|---|
| 0 | 38.2 |
| 12 | 38.8 |
| 24 | 39.7 |
| 36 | 39.6 |
| 48 | 38.6 |
| 60 | 36.6 |
| (¹) | 35.6 |

¹ No second addition.

It will be aparent that optimum yields of ethanol are obtained when 1.5% mold bran is added between the 24th and 36th hours after inoculation. These ranges will, of course, vary slightly with the type of grain and the particular diastatic agent used but they give near enough the optimum yield of ethanol in all cases to constitute the preferred embodiment of my invention. I do not, of course, wish to be limited thereto.

The mold bran utilized in the example was prepared as follows although any of several methods known to the art would be equally satisfactory. Bran was moistened with an approximately equal weight of water and acidified to a pH of 4.5. It was then sterilized by heating for about 30 minutes at 110° C., cooled to 35° C., and inoculated with spores of *Aspergillus oryzae*. The inoculated bran was then held between 35° C. and 45° C. for from 24 to 48 hours with sufficient aeration to provide aerobic conditions and to remove the heat generated.

I have described in some detail a two-stage saccharification process but it is obvious that more than two additions of the diastatic agent may be made. It is only necessary to so regulate the amount of diastatic material added at any one time that there is never more than the optimum concentration present and to provide for at least one addition after the fermentation has started. Satisfactory results may be obtained, in general, when the amount of the enzymatic diastatic agent added before fermentation is between 1.5% and 3% and that after fermentation has started between 1% and 2%, all percentages being based on the original grain content dry. The preferred proportions are about 2% enzymatic diastatic agent added before inoculation and about 1.5% after, but the invention is not limited to these particular proportions.

While the example has set forth the saccharification and fermentation of corn, other grains, such as grain sorghums, barley, rye, wheat, rice, oats, etc., may comprise the starting material. It is not necessary to use the particular mold bran diastatic agent disclosed; also effective are mold brans prepared by growing species of the genera Rhizopus or Mucor on wheat bran, as well as diastatic molds grown on other solid substrates than bran such as rice, etc. Moreover, dried or green malts made from barley, rye or other grain may be used but for practical reasons the various diastatic molds are preferred due to the high cost of malt.

The process of the present invention may advantageously be combined with the acid cooking and quick cooling processes of my copending applications referred to above. With rapid mash cooling, a second mold bran addition at the 24th hour of fermentation increased the yield of ethanol from 34% by weight of the total dry matter charged to process to 38%. In another case where the acid cooking process was used, a similar mold bran addition increased the ethanol yield from 38% to 42% on the same basis.

I claim:

1. In a process for the production of ethanol from amylaceous material comprising gelatinizing the starchy content of said amylaceous material, converting said gelatinized starchy content to fermentable sugars by means of a plurality of additions of an enzymatic diastatic agent, and fermenting the sugars with yeast, the improvement which comprises adding before alcoholic fermentation an amount of the enzymatic diastatic agent between 1.5% and 3% of the starchy content of the amylaceous material on a moisture-free basis and adding after the 20th hour of alcoholic fermentation a further amount of the enzymatic diastatic agent between 1% and 2% of the original starchy content on a moisture-free basis.

2. The process of claim 1 in which the enzymatic diastatic agent is a mold bran obtained by growing *Aspergillus oryzae* on wheat bran.

3. In a process for the production of ethanol from amylaceous material comprising gelatinizing the starchy content of said amylaceous material, converting said gelatinized starchy content to fermentable sugars with yeast, the improvement which comprises adding before alcoholic fermentation enzymatic diastatic agent in the amount of 2% of the starchy content of the amylaceous material on a moisture-free basis and adding between the 20th and 30th hours of alcoholic fermentation further enzymatic diastatic agent in the amount of 1.5% of the original starchy content on a moisture-free basis.

LEO M. CHRISTENSEN.